J. W. HARDIE.
Churn.
No. 27,446.
Patented March 13, 1860.
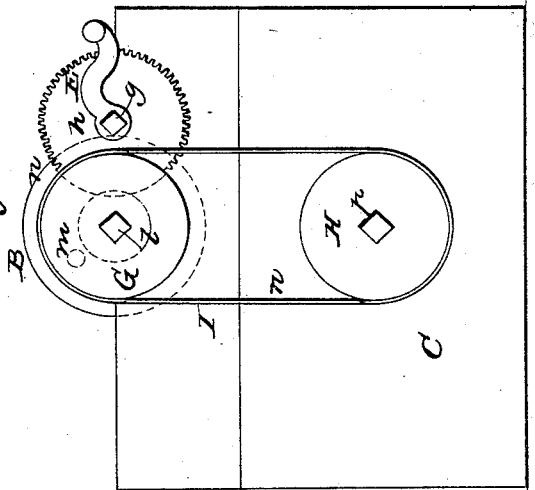
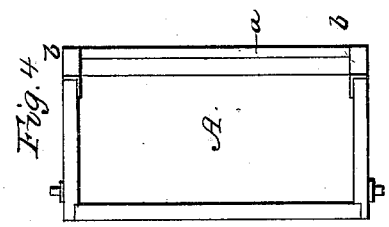
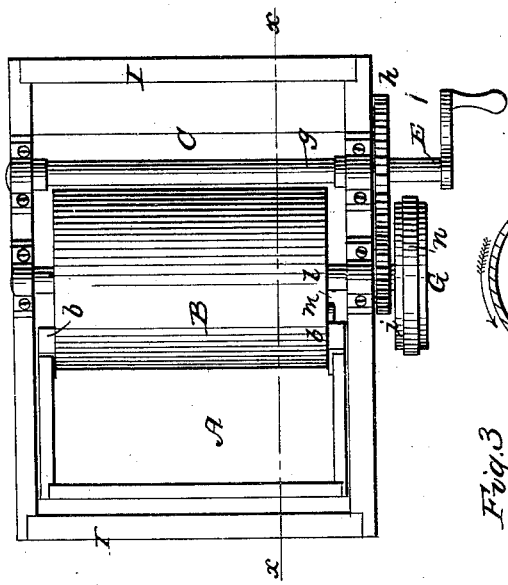
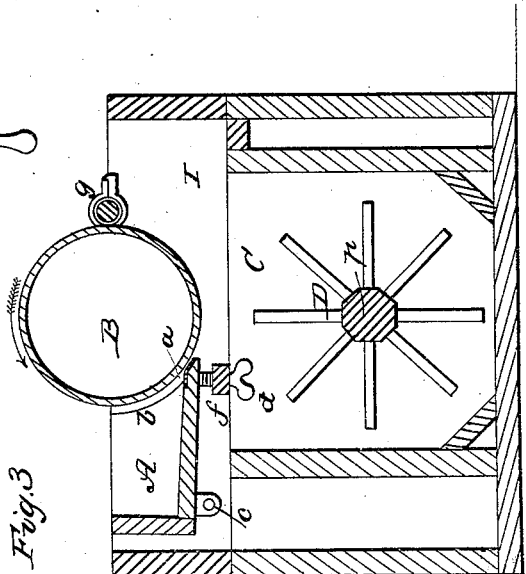

UNITED STATES PATENT OFFICE.

JASON W. HARDIE, OF NEW YORK, N. Y.

CHURN.

Specification of Letters Patent No. 27,446, dated March 13, 1860.

*To all whom it may concern:*

Be it known that I, JASON W. HARDIE, of New York, in the county of New York and State of New York, have invented a new and Improved Churn; and I do hereby declare that the following is a full and exact description thereof, reference being had to the accompanying drawings, making part of this specification.

Figure 1, being a plan of the churn; Fig. 2, a side elevation thereof; Fig. 3, a longitudinal, vertical section thereof, in the plane indicated by the line $x$ $x$, Fig. 1; Fig. 4, a plan of a part detached.

Like letters designate corresponding parts in all the figures.

The churn-body C, may be of any convenient form. Upon this the frame I, in which the working parts are mounted, is secured so as to be removable, for convenience in getting access to the interior of the churn. A hollow, water-tight cylinder B, is mounted on the frame I, and is revolved by means of a pinion $i$, on its shaft, into which gears a cog-wheel $h$, operated by a winch E; or in any other convenient manner. A box, or vessel, A, which may be termed the "hopper," for receiving the milk or cream, is mounted in the frame I, over the churn body. This "hopper" is inclosed on three sides, while the fourth side thereof is stopped by the cylinder B. The inner edge of the bottom of this hopper, is formed so as to closely fit the periphery of the cylinder, with which it comes in contact; and this edge is covered with a plate or face $a$, of iron, or other sufficiently durable and firm material. Packing strips $b$, $b$, of any suitable material are secured to the inner edges of the adjacent sides of the "hopper," for the ends of the cylinder to work against, and thereby prevent the milk or cream escaping around the ends of said cylinder. The rear of the "hopper" is pivoted, as at $c$, to the frame I, and the front thereof is sustained by a thumb-screw $d$, passing through a cross-piece $f$, of the frame I, or by any other convenient means, so that the plate, or face, $a$, may be adjusted as close to the cylinder B, as may be desired. When thus arranged, by revolving the cylinder in the direction indicated by the arrow, the milk or cream in the "hopper," will gradually pass between said cylinder and the plate, or face, $a$; by which act, the butter globules are crushed, and only require further to be gathered together to complete the churning. The gathering is effected, as the milk, or cream, with its crushed globules, flows into the churn body, by a dasher D, in the bottom of the churn; said dasher being actuated by connecting a pulley H, on its shaft $p$, with a pulley G, on the shaft $l$, of the cylinder B, by a band $n$; or in any other convenient manner.

Hot water is admitted into the cylinder through an aperture in one end thereof, for the purpose of imparting the proper temperature to the butter globules. This aperture is closed by a stopper $m$, or otherwise. It is desirable to have the butter globules warmed only at the moment they are acted on, and to heat the milk or cream as little, and as little time, as possible, to make good butter. The hot-water cylinder, in this operation, tends to heat the milk or cream but very little except at the moment of acting on it, thus accomplishing the purpose desired. And the cream, after passing under the cylinder, falls in a thin sheet, or in small streams, or drops, through the air, into the churn body beneath, thereby again parting with much of the heat acquired from the cylinder.

I am aware that cylinders working in contact with each other, have been employed for a similar purpose; and also that the cream has been passed between plane, rubbing surfaces, to effect the same result; also that the use of hot water, in the dasher, or so as to impart heat to the main body of cream, is not new but these devices are clearly distinct from that above described, and I disclaim them entirely; but

What I claim as my invention and desire to secure by Letters Patent, is—

The combination of a hollow, revolving cylinder containing hot water or its equivalent, with a fixed surface fitting against its periphery and adjustable to different degrees of closeness thereto, whereby, not only are the cream globules effectually crushed, but the requisite degree of temperature is imparted to the cream only momentarily, while passing beneath the cylinder, and is again dissipated, mostly, by the falling of the cream into the churn-body below, substantially as herein specified.

In witness that the above is a true specification of my improved churn, I hereunto set my hand, this 25th day of October, 1859.

JASON W. HARDIE.

Witnesses:
 EDMUND B. BRADY,
 ALFRED BRADY.